(12) United States Patent
Gueguen

(10) Patent No.: US 7,292,658 B2
(45) Date of Patent: Nov. 6, 2007

(54) METHOD AND DEVICE FOR EFFICIENT DECODING OF SYMBOLS TRANSMITTED IN A MIMO TELECOMMUNICATION SYSTEM

(75) Inventor: Arnaud Gueguen, Rennes Cedex 7 (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 694 days.

(21) Appl. No.: 10/787,114

(22) Filed: Feb. 27, 2004

(65) Prior Publication Data

US 2004/0228423 A1    Nov. 18, 2004

(30) Foreign Application Priority Data

Feb. 28, 2003    (EP) .................... 03290482

(51) Int. Cl.
*H03D 1/00*    (2006.01)
*H04L 27/06*    (2006.01)

(52) U.S. Cl. ...................... 375/341; 375/262

(58) Field of Classification Search ........ 375/259–260, 375/262, 267, 341, 347, 350
See application file for complete search history.

(56) References Cited

U.S. PATENT DOCUMENTS

| | | | |
|---|---|---|---|
| 6,718,504 B1 * | 4/2004 | Coombs et al. ............. | 714/755 |
| 7,020,175 B2 * | 3/2006 | Frank ......................... | 375/130 |
| 7,095,812 B2 * | 8/2006 | Chan et al. .................. | 375/341 |
| 2005/0078761 A1 * | 4/2005 | Hottinen et al. ............ | 375/267 |
| 2006/0291581 A1 * | 12/2006 | Onggosanusi et al. ...... | 375/267 |

FOREIGN PATENT DOCUMENTS

| | | | |
|---|---|---|---|
| EP | 1069722 A | | 1/2001 |
| EP | 1133071 A | | 9/2001 |
| FR | 2810175 A | | 12/2001 |
| WO | WO 01/19013 A | | 3/2001 |
| WO | WO 01/76094 A | | 10/2001 |
| WO | WO 03/001726 A | | 1/2003 |

OTHER PUBLICATIONS

Abe, Matsumoto: "Space-Time Turbo Equalization and Symbol Detection in Frequency Selective MIMO Channels"—IEEE Vehicular Technology Conference, Oct. 7-11, 2001, pp. 1230-1234, XP001124945, New York, NY.

(Continued)

*Primary Examiner*—Jean B. Corrielus
(74) *Attorney, Agent, or Firm*—Oblon, Spivak, McClelland, Maier & Neustadt, P.C.

(57) ABSTRACT

A method for decoding at least one signal transmitted by means of at least one antenna and received by means of at least one antenna, which method includes a symbol decoding step for producing at least one estimated symbol representative of at least one transmitted symbol carried by the received signal. The symbol decoding step is executed by a space-time decoder including a symbol decoder configured to produce an estimation of at least one symbol with respect to which estimation the transmitted symbol features a minimum mean square error. The minimum mean square error symbol decoder requires less operating computing power than other decoders currently used for decoding incoming symbols, like list sphere decoders.

6 Claims, 2 Drawing Sheets

OTHER PUBLICATIONS

Reynolds, Xiaodong Wang: "Low-Complexity Turbo-Equalization for Diversity Channels"—Signal Processing, vol. 81, No. 5, May 2001, pp. 989-995, XP004239259, Amsterdam, NL.

Kothandaraman: "Turbo Coded Blast"—IEEE Information Theory Workshop, Oct. 20-25, 2002, p. 217, XP002250465, Piscataway, US.

Singer, et al: "Linear Interative Turbo-Equalization (Lite) for Dual Channels"—Silomar Conference on Signals, Systems, and Computers, Oct. 24-27, 1999, pp. 1670-1674, XP010373913, New York, US.

* cited by examiner

METHOD AND DEVICE FOR EFFICIENT DECODING OF SYMBOLS TRANSMITTED IN A MIMO TELECOMMUNICATION SYSTEM

BACKGROUND OF THE INVENTION

1. Field of the Invention

The present invention relates to a method for decoding at least one signal transmitted by means of at least one antenna and received by means of at least one antenna, which method includes a symbol decoding step for producing at least one estimated symbol representative of at least one transmitted symbol carried by the received signal.

2. Description of the Background

Such signals are exchanged in telecommunication systems of the Multiple Input Multiple Output type, further referred to as MIMO systems. A main feature of MIMO systems lies in the fact that a plurality of antennas may be used both at a transmitter end and at a receiver end of a wireless link. MIMO systems have been shown to offer large transmission capacities compared to those offered by single antenna systems. In particular, MIMO capacity increases linearly with the number of transmitting or receiving antennas, whichever the smallest, for a given Signal-to-Noise Ratio (SNR) and under favourable uncorrelated channel conditions. Specific coding schemes have been designed to exploit such an increased available transmission capacity. These schemes, called space-time codes, mainly aim at transmitting signals that are redundant in space and time, which means that a same information shall be transmitted over several antennas and several times, in order to benefit from the spatial diversity offered by the multiple antennas. Several types of space-time codes, designed according to various criteria, can be found in the literature.

Due to the advantages described above, MIMO techniques are likely to be used in future wireless systems intended to provide large spectral efficiencies or, alternatively, reduce the transmitting power required for obtaining a spectral efficiency equivalent to that which is obtained in current telecommunication systems. Such MIMO techniques will very likely be combined with multi-carrier modulation techniques like OFDM (standing for Orthogonal Frequency Duplex Multiplex) and MC-CDMA (standing for MultiCarrier-Code Division Multiple Access), which are also likely to be used in future wireless systems. In specific embodiments of MIMO systems, the information to be transmitted may be encoded with respect to space and time in a manner allowing to use only one antenna at the receiver end.

In the present state of the art, several aspects of space-time encoded MIMO systems are still open issues, such as symbol detection schemes to be used on the receiver end of a signal transmitted by a transmitter using multiple antennas. Indeed, such a signal must be decoded by the receiver by means of a space-time decoder presenting a complexity which should be as low as possible. Among existing space-time coding schemes, only Space-Time Orthogonal Block Codes (STOBC) enable optimal symbol decoding with reduced complexity. However, STOBC are suboptimal, in terms of mutual information for a channel rank bigger than one, which is often the case when there is more than one receiving antenna. However, the above-described advantages of MIMO systems are in principle obtained by using more than one receiving antenna.

More spectrally efficient schemes such as Bell Labs lAyered Space Time codes (BLAST) or, more generally, Linear Dispersion Codes (LDC) involve a symbol decoding complexity, which may, in the case of maximum likelihood decoding, increase exponentially with the spectral efficiency, and execution of true maximum likelihood or a posteriori probability (APP) decodings appears unrealistic for high spectral efficiencies. This is annoying when MIMO techniques are used for addressing large spectral efficiencies.

List Sphere Decoding (LSD) provides nearly optimal APP decoding, but involves so much computing power that its practical implementation in a terminal which is to be power-fed by a battery still appears unrealistic in many cases.

SUMMARY OF THE INVENTION

One of the goals of the invention is to enable a decoding of space-time encoded information, which decoding features a lower complexity and requires less computing power than the known techniques described above.

Indeed, a method according to the opening paragraph is characterized according to one aspect of the invention in that the symbol decoding step is executed by producing an estimation of at least one symbol with respect to which estimation the transmitted symbol features a minimum mean square error.

The invention makes use of a minimum mean square error decoder for estimating the transmitted symbols, which decoder requires less operating computing power than other decoders currently used for this purpose, like list sphere decoders.

According to a specific embodiment of the invention, the symbol decoding step is further intended to provide likelihood output values intended to be used in the course of execution of a bit decoding step, which bit decoding step is intended to provide bit likelihood values intended to be used in the course of execution of the symbol decoding step as a priori likelihood input values.

The method according to this specific embodiment of the invention will be carried out iteratively and will thus output results having an accuracy akin to a much more complex known method, as for example a List Sphere Decoding (LSD) method, due to the fact that successive iterations will enable converging approximations towards more reliable estimates of transmitted information.

According to an advantageous embodiment of the invention, a priori likelihood input values related to a given transmitted symbol are not used for producing an estimation of said given transmitted symbol.

This advantageous embodiment of the invention enables to prevent contamination of extrinsic data related to a given symbol by a priori data related to this same symbol. This, however, is achieved by simultaneously discarding all the data carried by the likelihood values related to said given symbol, which will have an impact on the relevance of the estimation which will be used for performing the bit decoding step.

A more precise way of preventing contamination of extrinsic data related to a given symbol by a priori data related to this same symbol is offered by another embodiment of the invention, according to which an a priori likelihood input value related to a given bit forming part of a given transmitted symbol is not used for producing an estimation of said given transmitted symbol.

According to this other embodiment of the invention, only one likelihood value related to a given bit of a given symbol will be discarded while estimating said given bit, other likelihood values related to other bits of the same symbol being taken into account, which enables to obtain a higher accuracy with respect to the previous embodiment.

According to one of its hardware-oriented aspects, the invention also relates to a device for decoding at least one signal transmitted by means of at least one antenna and received by means of at least one antenna, which device includes a symbol decoder intended to produce at least one estimated symbol representative of at least one transmitted symbol carried by the received signal, device characterized in that the symbol decoder is intended to produce an estimation of at least one symbol with respect to which estimation the transmitted symbol features a minimum mean square error.

According to a specific embodiment of such a device, the symbol decoder is further intended to provide likelihood output values intended to be used as input values by a bit decoder, which bit decoder is intended to provide bit likelihood values intended to be used by the symbol decoder as a priori likelihood input values.

According to an advantageous embodiment of this hardware-oriented aspect of the invention, the symbol decoder includes filtering means intended to selectively discard any a priori likelihood input value related to a given transmitted symbol when producing an estimation of said given transmitted symbol.

According to another advantageous embodiment of this hardware-oriented aspect of the invention, the symbol decoder includes filtering means intended to selectively discard a priori likelihood input values related to a given bit forming part of a given transmitted symbol when producing an estimation of said given transmitted symbol.

According to another of its hardware-oriented aspects, the invention also relates to a telecommunication system including at least one transmitter intended to output at least one signal transmitted by means of at least one antenna, and at least one receiver intended to receive said signal by means of at least one antenna, telecommunication system in which the receiver is a device as described above.

DESCRIPTION OF THE FIGURES

The characteristics of the invention mentioned above, as well as others, will emerge more clearly from a reading of the following description given in relation to the accompanying figures, amongst which.

DETAILED DESCRIPTION OF THE INVENTION

Figure 1:
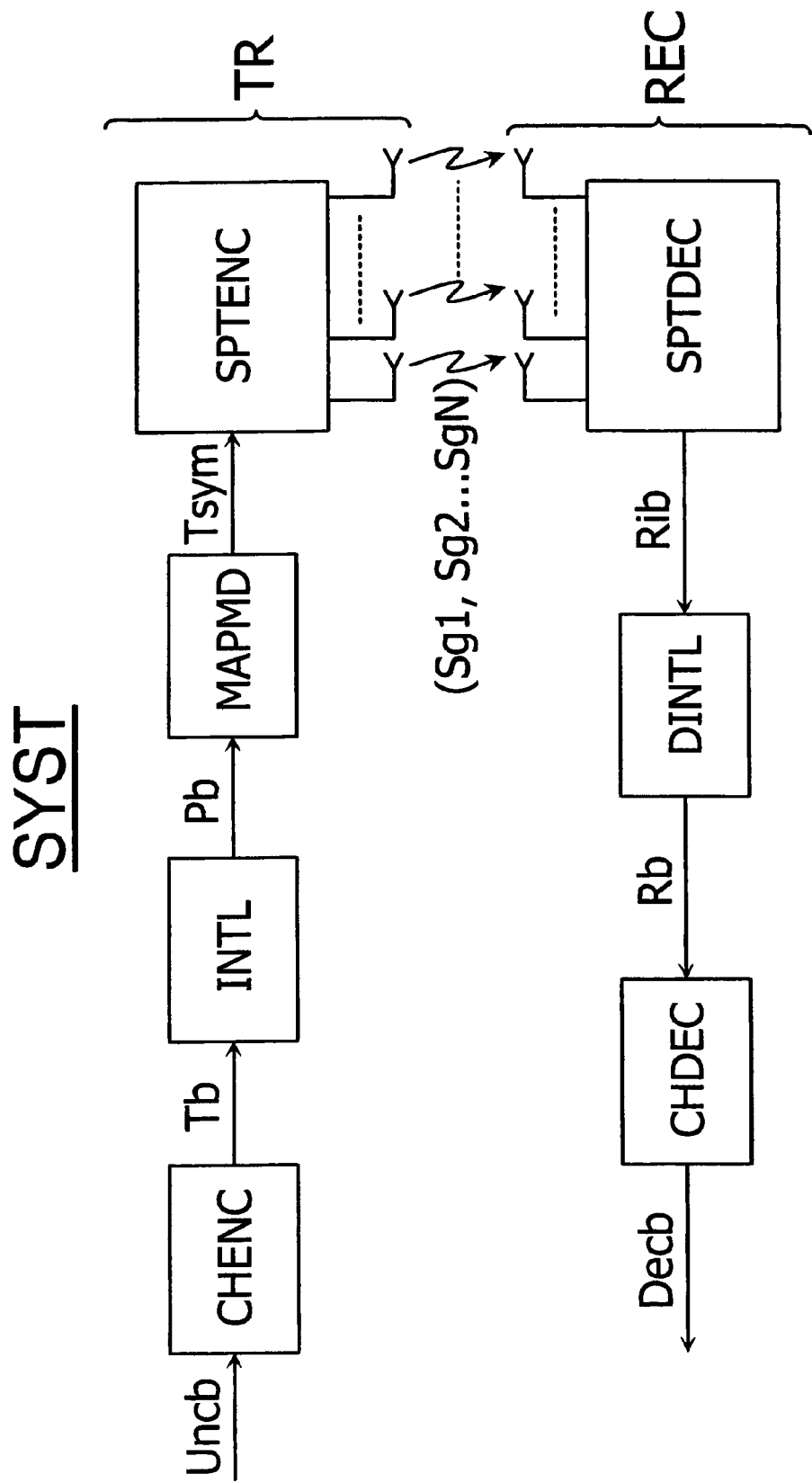
FIG. 1 is a block diagram showing a highly simplified MIMO telecommunication system.

FIG. 1 diagrammatically shows a telecommunication system including at least one transmitter TR and one receiver REC, intended to exchange in this example multiple signals Sg1, Sg2 . . . SgN by means of, respectively, multiple transmitting and receiving antennas.

The transmitter TR shown in the example depicted here includes a channel encoder CHENC intended to apply an encoding, e.g. by means of a convolutional code or of a turbo code, to uncoded data bits Uncb, and to provide a binary stream Tb to be transmitted. The transmitter TR includes an interleaver INTL intended to generate permutated bits Pb, such an interleaving being useful for a later processing on the receiver side, since it will allow to obtain uncorrelated data. The permutated bits Pb are then divided into sequences of Mc bits each, which bit sequences are then mapped, i.e. transformed into a succession of Q coded symbols Tsym by a mapping and modulation module MAPMD, each symbol thus corresponding to Mc successive bits.

The Q successive symbols are intended to be fed to a space-time encoder SPTENC, which produces signals obtained by linear combination of real and imaginary components of said Q symbols, which signals will be transmitted, in this example, over a plurality of antennas during several time durations, each time duration corresponding to that of each symbol, hence the name space-time encoder.

The receiver REC shown in the example depicted here includes a space-time decoder SPTDEC intended to produce estimates of transmitted symbols on the basis of information carried by multiple signals Sg1, Sg2 . . . SgN received from the transmitter TR, which estimates will be used for producing likelihood values Rib related to estimates of the transmitted permutated bits Pb, which likelihood values are intended to be de-interleaved by a de-interleaver DINTL which is to output soft likelihood values Rb related to estimates of bits included in the binary stream Tb. A bit decoder included in the receiver REC, further referred to as channel decoder CHDEC, is intended to generate, on the basis of said likelihood values Rb, decoded data bits Decb which should ultimately correspond to the originally uncoded data bits Uncb.

Former studies, the contents of which are known to those skilled in the art and will not be further described herein, have shown that the received signals Sg1, Sg2 . . . SgN can be processed so as to produce a vector "y" which may be written as:

$$y = As + n$$

where "A" is a square matrix belonging to $R^{2Q*2Q}$, and is representative of properties of communication channels through which the multiple signals Sg1, Sg2 . . . SgN are received by the receiver REC from the transmitter TR, and of the space-time code structure, "s" is an $R^{2Q}$ transmitted symbol vector whose components are successively the real and imaginary parts of the Q transmitted symbols Tsym and "n" is an $R^{2Q}$ vector representative of noise adversely affecting said communication channels, which noise may for example be modeled by Additive White Gaussian Noise (AWGN). The contents of the channel matrix A are supposed to be perfectly known or at least estimated at this stage, e.g. thanks to a previous study of alterations said channels have produced on pilot signals, according to a technique well-known to those skilled in the art.

A first task assigned to the receiver REC thus consists in extracting an affine estimate vector $\hat{s} \in R^{2Q}$ of the symbol vector s from the vector $y \in R^{2Q}$, each symbol "$s_q$" among the Q symbols included in the symbol vector s featuring a real part $\alpha_q$ and an imaginary part $\beta_q$, which can be expressed as follows:

$$s = \begin{pmatrix} \alpha_1 \\ \beta_1 \\ \vdots \\ \alpha_Q \\ \beta_Q \end{pmatrix}$$

Figure 2:
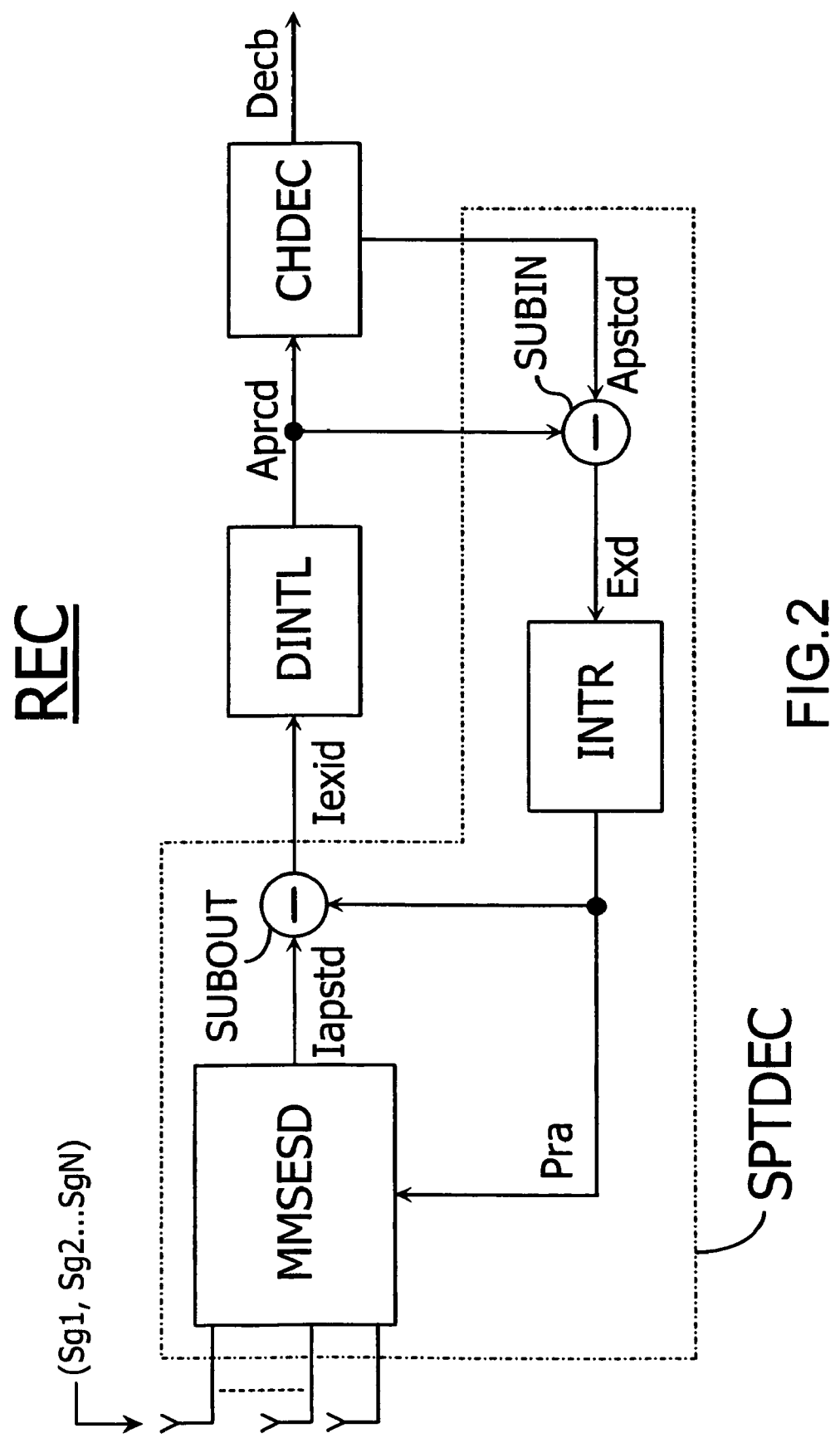
FIG. 2 is a block diagram showing a MIMO receiver included in such a telecommunication system, according to the invention.

FIG. 2 diagrammatically shows a receiver REC including a symbol decoder MMSESD according to the invention.

This symbol decoder MMSESD is intended to execute a symbol decoding step by producing an estimation of symbols $\hat{s}_q$ with respect to which the transmitted symbols $s_q$ feature a minimum mean square error.

A resulting corresponding estimated symbol vector "ŝ" can be written as:

$$\hat{s} = My + d$$

each symbol estimation being further used for providing a posteriori interleaved data Iapstd representing likelihood values related to bits constituting said estimated symbol. "M" and "d" are a matrix and a vector, belonging to $R^{2Q*2Q}$ and $R^{2Q}$ respectively, which are such that the Mean Square Error (MSE) between ŝ and s is minimum, which can be written as:

$$M, d = \underset{M,d}{\operatorname{argmin}}\left(E_{s,n}(\|s - \hat{s}\|^2)\right)$$

The square error can be expressed as:

$$\|s - \hat{s}\|^2 = Tr((s-\hat{s})(s-\hat{s})^T)$$

Components of the matrices M and d can be obtained by nulling the gradients of the MSE with respect to M and d:

$$\begin{cases} \operatorname{grad}_M\left(E_{s,n}(\|s-\hat{s}\|^2)\right) = 0 \\ \operatorname{grad}_d\left(E_{s,n}(\|s-\hat{s}\|^2)\right) = 0 \end{cases} \quad \text{(System 1)}$$

where $E_{s,n}$ represents an expectation with respect to the transmitted symbols statistics and to the noise.

The above equation system yields:

$$\begin{cases} M = \operatorname{cov}(s,s)A^T(A\operatorname{cov}(s,s)A^T + \sigma^2 I_{2Q})^{-1} \\ d = E_s(s) - MA\, E_s(s) \end{cases} \quad \text{(System 2)}$$

where $A^T$ is a transposed A matrix, $\sigma^2$ represents a noise variance per real dimension, $I_{2Q}$ is an identity matrix of dimension 2Q, and $\operatorname{cov}(s,s) \in R^{2Q*2Q}$ is a covariance matrix of the input signal s, which is given by:

$$\operatorname{cov}(s,s) \triangleq E_s((s-E_s(s))(s-E_s(s))^T) = E_s(ss^T) - E_s(s)E_s(s^T)$$

According to the advantageous embodiment depicted here, the symbol decoder MMSESD is intended to provide a posteriori bit likelihood output values Iapstd, which will serve for producing a priori data Aprcd intended to be used in the course of execution of a bit decoding step by the channel decoder CHDEC. The bit decoding step is intended to produce soft estimates of decoded data bits Decb, as well as to provide related a posteriori bit likelihood values Apstcd related to estimates of coded bits, which a posteriori bit likelihood values Apstcd will serve for producing a priori likelihood input values Pra intended to be used in the course of execution of the symbol decoding step.

To this end, cov(s,s) and $E_s(s)$ will be estimated using a priori interleaved data Pra related to the bits forming the symbols of s, which data Pra will be made available in this example at an output of an interleaver INTR on the basis of the a posteriori bit likelihood values Apstcd.

The aim of the space-time decoder SPTDEC is to provide extrinsic data Iexid related to each bit of the input symbols $s_q = \alpha_q + j\beta_q$, $q \in [1, Q]$. For an iterative process like the one presently described to work efficiently, the a priori data related to a given bit or symbol should not be used to produce extrinsic data related to this same bit or symbol. Therefore, the a priori data related to bits belonging to symbol $s_q$ for a given q should not be used to produce extrinsic data related to these bits. As these extrinsic data are produced from the soft estimate of symbol $s_q$, the a priori data related to these bits should not be used to produce the soft estimate of symbol $s_q$. Taking this into account, the above equation should be separated into a set of 2Q equations, one per real dimension, where the estimate related to each real dimension does not use the a priori data related to the associated symbol. The minimum mean square error symbol decoder MMSESD included according to this preferred embodiment of the invention in the receiver REC will thus perform the task of computing soft estimates $\hat{\alpha}_q$ and $\hat{\beta}_q$ according to the following equation system:

$$\begin{cases} \hat{\alpha}_q = E_s^q(\alpha_q) + (\operatorname{cov}_q(s,s))_{line\,2q-1} \\ \qquad A^T(A\operatorname{cov}_q(s,s)A^T + \sigma^2 I_{2Q})^{-1}(y - AE_s^q(s)) \\ \hat{\beta}_q = E_s^q(\beta_q) + (\operatorname{cov}_q(s,s))_{line\,2q} \\ \qquad A^T(A\operatorname{cov}_q(s,s)A^T + \sigma^2 I_{2Q})^{-1}(y - AE_s^q(s)) \end{cases} \quad \text{(System 3)}$$

which requires a relatively low amount of computing power with respect to that required for the operation of a list sphere decoder.

In the above equation system, $E_s^q(s)$ represents an expectation of s with respect to the transmitted symbols statistics (and to the noise), using all a priori data available, except the a priori data related to the bits of $s_q$. Similarly, $\operatorname{cov}_q(s,s)$ is the covariance of s using all a priori data available, except the a priori data related to the bits of $s_q$.

An input subtractor SUBIN is intended to subtract a priori data Aprcd from the a posteriori bit likelihood values Apstcd, which will produce extrinsic data Exd. This extrinsic data Exd will then be used, after interleaving by an interleaver INTR, as a priori likelihood input values Pra by the symbol decoder MMSESD for obtaining $E_s^q(s)$ and $\operatorname{cov}_q(s,s)$.

Similarly, the space-time decoder SPTDEC includes an output subtractor SUBOUT intended to subtract a priori information Pra from a posteriori likelihood values Iapstd in order to produce extrinsic data Iexid intended to be used, after de-interleaving by de-interleaver DINTL, as a priori input data Aprcd by the channel decoder CHDEC.

A removal by subtraction means of a priori data from a posteriori data in order to obtain extrinsic data as described above is suited to cases in which logarithmic likelihood values are used. In other cases, such a removal may be done in a different manner, e.g. by dividing the a posteriori data by the a priori data if probability values are used.

The above described exclusion of a priori statistics related to a given symbol from the computation of an estimation of said symbol can be expressed as follows:

$$\begin{cases} E_s^q(s) = (E_s(\alpha_1)E_s(\beta_1) \ldots E_s(\alpha_{q-1})E_s(\beta_{q-1}) 0\ 0 \\ \quad E_s(\alpha_{q+1})E_s(\beta_{q+1}) \ldots E_s(\alpha_Q)E_s(\beta_Q))^T \\ \text{cov}_q(s,s) = \text{diag}(\text{cov}(\alpha_1)\text{cov}(\beta_1) \ldots \text{cov}(\alpha_{q-1})\text{cov}(\beta_{q-1}) \\ \quad \frac{\sigma_s^2}{2} \frac{\sigma_s^2}{2} \text{cov}(\alpha_{q+1})\text{cov}(\beta_{q+1}) \ldots \text{cov}(\alpha_Q)\text{cov}(\beta_Q)) \end{cases} \quad 5$$

The above equation systems yield, when combined:

$$\begin{cases} \hat{\alpha}_q = \frac{\sigma_s^2}{2}(A_{column2q-1})^T(A\text{cov}_q(s,s)A^T + \sigma^2 I_{2Q})^{-1}(y - AE_s^q(s)) \\ \hat{\beta}_q = \frac{\sigma_s^2}{2}(A_{column2q})^T(A\text{cov}_q(s,s)A^T + \sigma^2 I_{2Q})^{-1}(y - AE_s^q(s)) \end{cases} \text{(System 4)}$$

It should be noted here that, in an alternative embodiment of the invention, instead of simultaneously discarding all the data carried by the likelihood values related to a given symbol $s_q$, which will have an impact on the accuracy of the performed estimation, a more precise way of preventing contamination of extrinsic data related to a given transmitted symbol $s_q$ by a priori data related to this same symbol $s_q$ may consist in discarding only the a priori bit likelihood value related to a given bit of said transmitted symbol $s_q$ while computing the extrinsic data related to the same given bit.

According to such an embodiment, (System 3) should then be splitted as follows:

$$\begin{cases} \hat{\alpha}_q^{qMc+j} = E_s^{qMc+j}(\alpha_q) + (\text{cov}_{qMc+j}(s,s))_{line2q-1} \\ \quad A^T(A\text{cov}_{qMc+j}(s,s)A^T + \sigma^2 I_{2Q})^{-1}(y - AE_s^{qMc+j}(s)) \\ \hat{\beta}_q^{qMc+j} = E_s^{qMc+j}(\beta_q) + (\text{cov}_{qMc+j}(s,s))_{line2q} \\ \quad A^T(A\text{cov}_{qMc+j}(s,s)A^T + \sigma^2 I_{2Q})^{-1}(y - AE_s^{qMc+j}(s)) \end{cases} \text{(System 3')}$$

with $q \in [1, Q]$ and $j \in [1, Mc]$, qMc+j being an index of the bit under consideration, the above described exclusion of a priori statistics related to a given bit of a given symbol from the computation of the extrinsic data related to the same given bit being then expressed by:

$$\begin{cases} E_s^{qMc+j}(s) = (E_s(\alpha_1)E_s(\beta_1) \ldots E_s(\alpha_{q-1})E_s(\beta_{q-1})E_s^{qMc+j}(\alpha_q)E_s^{qMc+j}(\beta_q) \\ \quad E_s(\alpha_{q+1})E_s(\beta_{q+1}) \ldots E_s(\alpha_Q)E_s(\beta_Q))^T \\ \text{cov}_{qMc+j}(s,s) = \text{diag}\begin{pmatrix} \text{cov}(\alpha_1)\text{cov}(\beta_1) \ldots \text{cov}(\alpha_{q-1})\text{cov}(\beta_{q-1}) \\ \text{cov}_{qMc+j}(\alpha_q)\text{cov}_{qMc+j}(\beta_q)\text{cov}(\alpha_{q+1}) \\ \text{cov}(\beta_{q+1}) \ldots \text{cov}(\alpha_Q)\text{cov}(\beta_Q) \end{pmatrix} \end{cases}$$

The expectations and covariances are computed by using the a priori information Pra available at the input of the symbol decoder MMSESD:

$$\begin{cases} E_s(\alpha_q) = \sum_{s_q} Pr_a(s_q) \cdot \text{Re}(s_q) \\ E_s(\beta_q) = \sum_{s_q} Pr_a(s_q) \cdot \text{Im}(s_q) \\ \text{cov}(\alpha_q) \stackrel{\Delta}{=} E_s(\alpha_q^2) - (E_s(\alpha_q))^2 \text{ and } E_s(\alpha_q^2) = \sum_{s_q} Pr_a(s_q) \cdot (\text{Re}(s_q))^2 \\ \text{cov}(\beta_q) \stackrel{\Delta}{=} E_s(\beta_q^2) - (E_s(\beta_q))^2 \text{ and } E_s(\beta_q^2) = \sum_{s_q} Pr_a(s_q) \cdot (\text{Im}(s_q))^2 \end{cases}$$

where $q \in [1, Q]$ and $Pr_a(s_q)$ is the a priori probability that the $q^{th}$ symbol of the transmitted symbol is $s_q$.

It must be noted here that the correct notation should be $Pr_a(S_q = s_q)$ where $S_q$ would be the statistical variable of the $q^{th}$ symbol and $s_q$ one possible value for $S_q$. This notation is simplified to $Pr_a(s_q)$ for the sake of readability. For the same purposes, all following notations on probabilities will use the same incorrect simplification mixing the statistical variable and its possible values.

The mapping executed by the transmitter of the received symbol will have associated, with a one-to-one relation, a sequence of Mc bits with a given transmitted symbol. The Mc bits associated with the $q^{th}$ symbol $s_q$ may thus be denoted $b_{qMc+1}, \ldots, b_{qMc+Mc}$. Assuming that a priori values related to the bits of one sequence of Mc bits are independent thanks to the interleaving executed by the transmitter, the a priori probability $Pr_a(s_q)$ is computed as follows:

$$Pr_a(s_q) = Pr_a(b_{qMc+1})Pr_a(b_{qMc+1}) \ldots Pr_a(b_{qMc+Mc})$$

In this example, the a priori probabilities, $Pr_a(b_{qMc+j})$, with $q \in [1, Q]$ and $j \in [1, M_c]$, are computed using extrinsic likelihood values Exd forming part of a posteriori bit likelihood values Apstcd available at the output of the channel decoder CHDEC. If a logarithm of the likelihood ratio of bit $b_{qMc+j}$ is noted $\lambda_{qM_s+j}^a$ then:

$$\lambda_{qMc+j}^a = \text{Ln}\frac{Pr_a(b_{qMc+j} = 1)}{Pr_a(b_{qMc+j} = 0)}$$

The a priori probabilities $Pr_a(b_{qMc+j} = b)$, where $b_{qMc+j}$ is here the statistical variable and b its value (0 or 1), may then be derived from the equation above.

A second task assigned to the symbol decoder MMSESD is to perform a soft demapping of the estimated symbols.

In order to compute soft estimates on the corresponding bits, it can be assumed that $\hat{\alpha}_q$ and $\hat{\beta}_q$ are outputs of equivalent AWGN channels with inputs respectively $\alpha_q$ and $\beta_q$:

$$\begin{cases} \hat{\alpha}_q = \mu_{2q-1}\alpha_q + \eta_{2q-1} \\ \hat{\beta}_q = \mu_{2q}\beta_q + \eta_{2q} \end{cases} \text{(System 5)}$$

where $\mu_{2q-1}$ and $\mu_{2q}$ are gains of the channels and $\eta_{2q-1}$ and $\eta_{2q}$ are zero mean real AWGN samples with variances respectively $v^2_{2q-1}$ and $v^2_{2q}$. Other means may of course be used for modelling the noise, as for example simulation means which will enable to define more accurate distributions than the assumed AWGN distribution described above.

The amplitudes $\mu_{2q-1}$ and $\mu_{2q}$ are computed as follows. On the one hand, it can be written that:

$$\begin{cases} E_{s,n}^q(\hat{\alpha}_q \alpha_q) = \mu_{2q-1} E_{s,n}^q(\alpha_q^2) \\ E_{s,n}^q(\hat{\beta}_q \beta_q) = \mu_{2q} E_{s,n}^q(\beta_q^2) \end{cases} \quad \text{(System 6)}$$

and on the other hand, according to (System 4):

$$\begin{cases} E_{s,n}^q(\hat{\alpha}_q \alpha_q) = \left(\frac{\sigma_s^2}{2}\right)^2 (A_{2q-1})^T (A\text{cov}_q(s,s)A^T + \sigma^2 I_{2Q})^{-1} A_{2q-1} \\ E_{s,n}^q(\hat{\beta}_q \beta_q) = \left(\frac{\sigma_s^2}{2}\right)^2 (A_{2q})^T (A\text{cov}_q(s,s)A^T + \sigma^2 I_{2Q})^{-1} A_{2q} \end{cases} \quad \text{(System 7)}$$

The equality of (System 6) and (System 7) gives:

$$\begin{cases} \mu_{2q-1} = \frac{\sigma_s^2}{2} (A_{2q-1})^T (A\text{cov}_q(s,s)A^T + \sigma^2 I_{2Q})^{-1} A_{2q-1} \\ \mu_{2q} = \frac{\sigma_s^2}{2} (A_{2q})^T (A\text{cov}_q(s,s)A^T + \sigma^2 I_{2Q})^{-1} A_{2q} \end{cases} \quad \text{(System 8)}$$

The variances may also be expressed as follows by using (System 4):

$$\begin{cases} v_{2q-1}^2 \triangleq E_{s,n}^q(\eta_{2q-1}^2) = E_{s,n}^q((\hat{\alpha}_q - \mu_{2q-1}\alpha_q)^2) \\ \qquad = \mu_{2q-1} \frac{\sigma_s^2}{2}(1 - \mu_{2q-1}) \\ v_{2q}^2 \triangleq E_{s,n}^q(\eta_{2q}^2) = E_{s,n}^q((\hat{\beta}_q - \mu_{2q}\beta_q)^2) \\ \qquad = \mu_{2q} \frac{\sigma_s^2}{2}(1 - \mu_{2q}) \end{cases} \quad \text{(System 9)}$$

Knowing the equivalent AWGN channels characteristics, it is possible to derive approximations of a posteriori logarithms of bit likelihood ratios, denoted $\lambda_{qM_c+j}^{pos}$ related to the bits $b_{qM_c+j}$, with $q \in [1, Q]$ and $j \in [1, M_c]$:

$$\lambda_{qM_c+j}^{pos} \approx \text{Ln} \frac{Pr(b_{qM_c+j}=1|\hat{s})}{Pr(b_{qM_c+j}=0|\hat{s})} \approx \text{Ln} \frac{Pr(b_{qM_c+j}=1|\hat{\alpha}_q, \hat{\beta}_q)}{Pr(b_{qM_c+j}=0|\hat{\alpha}_q, \hat{\beta}_q)}$$

$$= \text{Ln} \frac{\sum_{s_q/b_{qM_c+j}=1} Pr(s_q|\hat{\alpha}_q, \hat{\beta}_q)}{\sum_{s_q/b_{qM_c+j}=0} Pr(s_q|\hat{\alpha}_q, \hat{\beta}_q)}$$

where the second equality assumes that, with the equivalent AWGN channel model, only $\hat{\alpha}_q$ and $\hat{\beta}_q$ contain information related to the bits $b_{qM_c+j}$, with $j \in [1, M_c]$. Each term of the sums included in the above equation may be computed as follows:

$$Pr(s_q|\hat{\alpha}_q, \hat{\beta}_q) = \frac{1}{p(\hat{\alpha}_q, \hat{\beta}_q)} p(\hat{\alpha}_q, \hat{\beta}_q|s_q) Pr_a(s_q)$$

$$= \frac{1}{p(\hat{\alpha}_q, \hat{\beta}_q)} p(\hat{\alpha}_q|\alpha_q) p(\hat{\beta}_q|\beta_q) Pr_a(s_q)$$

where p(.) denotes a probability density function. Using the equivalent AWGN channel characteristics, the probability density functions $p(\hat{\alpha}_q|\alpha_q$ and $p(\hat{\beta}_q|\beta_q)$ may be written as follows:

$$\begin{cases} p(\hat{\alpha}_q|\alpha_q) = \frac{1}{\sqrt{2\pi v_{2q-1}^2}} \exp\left(-\frac{(\hat{\alpha}_q - \mu_{2q-1}\alpha_q)^2}{2 v_{2q-1}^2}\right) \\ p(\hat{\beta}_q|\beta_q) = \frac{1}{\sqrt{2\pi v_{2q}^2}} \exp\left(-\frac{(\hat{\beta}_q - \mu_{2q}\beta_q)^2}{2 v_{2q}^2}\right) \end{cases}$$

As explained above, the a priori probability of the $q^{th}$ transmitted symbol $s_q$ is given by:

$$Pr_a(s_q) = Pr_a(b_{qM_c+1}) Pr_a(b_{qM_c+1}) \ldots Pr_a(b_{qM_c+M_c})$$

A combination of the above equation with the previous system and equation thus gives:

$$\lambda_{qM_c+j}^{pos} \approx \text{Ln} \frac{\sum_{s_q/b_{qM_c+j}=1} \exp\left(-\frac{(\hat{\alpha}_q - \mu_{2q-1}\alpha_q)^2}{2 v_{2q-1}^2}\right) \exp\left(-\frac{(\hat{\beta}_q - \mu_{2q}\beta_q)^2}{2 v_{2q}^2}\right) \prod_{k=1\ldots M_c} Pr_a(b_{qM_c+k})}{\sum_{s_q/b_{qM_c+j}=0} \exp\left(-\frac{(\hat{\alpha}_q - \mu_{2q-1}\alpha_q)^2}{2 v_{2q-1}^2}\right) \exp\left(-\frac{(\hat{\beta}_q - \mu_{2q}\beta_q)^2}{2 v_{2q}^2}\right) \prod_{k=1\ldots M_c} Pr_a(b_{qM_c+k})}$$

The relationship between a priori, a posteriori and extrinsic probabilities (respectively $p^a$, $p^{pos}$ and $p^{extr}$) is $p^{extr}=p^{pos}/p^a$. Equivalently, between a priori, a posteriori and extrinsic logarithms of likelihood ratios (respectively $\lambda^a$, $\lambda^{pos}$ and $\lambda^{extr}$) the relationship is $\lambda^{extr}=\lambda^{pos}-\lambda^a$. Thus, the expression of the extrinsic logarithm of the likelihood ratio related to bit $b_{qM_c+j}$ is:

$$\lambda_{qM_c+j}^{extr} \approx \text{Ln} \frac{\sum_{s_q/b_{qM_c+j}=1} \exp\left(-\frac{(\hat{\alpha}_q - \mu_{2q-1}\alpha_q)^2}{2 v_{2q-1}^2}\right) \exp\left(-\frac{(\hat{\beta}_q - \mu_{2q}\beta_q)^2}{2 v_{2q}^2}\right) \prod_{k=1\ldots M_c, k\neq j} Pr_a(b_{qM_c+k})}{\sum_{s_q/b_{qM_c+j}=0} \exp\left(-\frac{(\hat{\alpha}_q - \mu_{2q-1}\alpha_q)^2}{2 v_{2q-1}^2}\right) \exp\left(-\frac{(\hat{\beta}_q - \mu_{2q}\beta_q)^2}{2 v_{2q}^2}\right) \prod_{k=1\ldots M_c, k\neq j} Pr_a(b_{qM_c+k})}$$

This extrinsic logarithm of the likelihood ratio will then form part of the extrinsic data Iexid which will be used as a priori input data Aprcd by the channel decoder CHDEC.

The operation of a space-time decoder SPTDEC including the minimum mean square error (MMSE) symbol decoder MMSESD described above is less complex than the operation of list sphere decoding (LSD)-based space-time decoder, which may be observed even when comparing several iterations in the operation of an MMSE-based space-time decoder with one iteration of an LSD-based space-time decoder. This is obvious when comparing the simulation speeds, as ratios of simulation speeds of several orders of magnitude have been observed.

This can be explained by identifying limiting (i.e. most complex) steps of both space-time decoders:

The limiting steps for an MMSE-based space-time decoder are, for each dimension q, the matrix inversion in (System 4) and, for each bit $b_{qMc+j}$ of the dimension, a marginalization performed with respect to all possible $2^{Mc}$ possible symbol values in the expression of the extrinsic likelihood ratio related said bit $b_{qMc+j}$. The matrix inversion complexity can be reduced in this case to $O(Q^2)$ operations. From one iteration of the scheme to the next one, this complexity may be further reduced. The marginalisation complexity is in the order of $O(2^{Mc})$ operations per bit. To provide the extrinsic information on all bits, the complexity thus becomes $O(Q^3+Q2^{Mc})$ operations.

In other embodiments of the invention not described herein, a recursive algorithm may be used for computing an inverted matrix related to a dimension q on the basis of a previously computed matrix related to dimension q−1, which will further reduce the complexity of the operation of an MMSE-based space-time decoder according to the invention.

The limiting steps for an LSD-based decoder are, for a first iteration:

for all 2Q dimensions, searching a Maximum Likelihood (ML) point, then establishing a list of lattice points inside a given sphere of average size $N_{list}$, and then, for each bit, marginalizing with respect to the $N_{list}$ lattice points. The ML point decoding has a complexity of $O(Q^6)$ operations. Establishing the list of lattice points inside the sphere has even larger complexity because the sphere radius cannot be reduced when enumerating the dimensions, whereas it was possible for the purpose of finding the ML point; moreover, the radius is set to a larger value than when searching for the ML point. Thus this complexity is at least $O(Q^6)$ operations. The marginalisation complexity is in the order of $O(N_{list})$ operations per bit. To provide the extrinsic information on all bits, the complexity becomes $O(Q^6+QN_{list})$ operations.

The limiting steps for an LSD-based decoder are, for following iterations:

marginalizing with respect to the $N_{list}$ lattice points, taking into account a priori information. To provide extrinsic information on all bits, the complexity becomes $O(QN_{list})$ operations.

This comparison shows that the operation of an MMSE-based space-time decoder is much less complex than that of an LSD-based space-time decoder, since. Q matrix inversions performed by the MMSE-based decoder are much less complex than the search for the ML point or the list enumeration performed by the LSD-based decoder. Besides, the marginalisation step of the MMSE-based space-time decoder is also much less complex than the marginalisation step of the LSD-based space-time decoder because $2^{Mc} \ll N_{list}$, and each marginalization step is much less complex in the MMSE-based decoder than in the LSD-based decoder. Moreover, the memory requirements of the LSD-based space-time decoder are closely linked to the size of the lists that must be stored from one iteration to the next one and for all space-time codewords of the frame being iteratively decoded. As the size of the list increases, the memory aspects will become critical.

The invention claimed is:

1. A method for receiving a signal transmitted by at least one antenna and received by at least one other antenna, comprising:

decoding a received symbol to produce at least one estimated symbol representative of at least one transmitted symbol embedded in the received signal, including:

estimating said at least one transmitted symbol based on a minimum mean square error calculation using an a priori likelihood input value for all possible transmitted symbols except said at least one transmitted symbol.

2. A method for receiving a signal transmitted by at least one antenna and received by at least one other antenna, comprising:

decoding a received symbol to produce at least one estimated symbol representative of at least one transmitted symbol, including:

estimating said at least one transmitted symbol based on a minimum mean square error calculation using an a priori likelihood input value for all bits of all possible transmitted symbols excluding a bit of said at least one transmitted symbol.

3. A receiver decoder for decoding a signal transmitted by at least one transmit antenna and received by at least one receive antenna, comprising:

a decoder configured to decode a received symbol to produce at least one estimated symbol representative of at least one transmitted symbol, said decoder including:

an estimator configured to estimate said at least one transmitted symbol based on a minimum mean square error calculation using an a priori likelihood input value for all possible transmitted symbols except said at least one transmitted symbol.

4. A receiver decoder for decoding a signal transmitted by at least one transmit antenna and received by at least one receive antenna, comprising:

a decoder configured to decode a received symbol to produce at least one estimated symbol representative of at least one transmitted symbol, said decoder including:

an estimator configured to estimate said at least one transmitted symbol based on a minimum mean square error calculation using an a priori likelihood input value for all bits of all possible transmitted symbols excluding a bit of said at least one transmitted symbol.

5. A telecommunication system, comprising:

a transmitter configured to transmit a plurality of transmitted signals; and a receiver configured to receive said transmitted signals and including a decoder configured to decode a received symbol to produce at least one estimated symbol representative of at least one of said transmitted symbols, said decoder including an estimator configured to estimate said at least one transmitted symbol based on a minimum mean square error calculation using an a priori likelihood input value for all possible transmitted symbols except said at least one transmitted symbol.

6. A telecommunication system, comprising:

a transmitter configured to transmit a plurality of transmitted signals; and a receiver configured to receive said transmitted signals and including a decoder configured to decode a received symbol to produce at least one estimated symbol representative of at least one of said transmitted symbols, said decoder including an estimator configured to estimate said at least one transmitted symbol based on a minimum mean square error calculation using an a priori likelihood input value for a bit of all possible transmitted symbols excluding said at least one transmitted symbol.

* * * * *